United States Patent
Cheung-Mon-Chan et al.

[19]

[11] Patent Number: 6,133,950
[45] Date of Patent: Oct. 17, 2000

[54] METHOD OF CHECKING THE CALIBRATION OF A DISPLAY SYSTEM IN PARTICULAR A PRINTER

[75] Inventors: Pascal Cheung-Mon-Chan, Paris; Vladislav Boutenko, Boulogne, both of France

[73] Assignee: GE Medical Systems, S.A., France

[21] Appl. No.: 09/241,811

[22] Filed: Feb. 2, 1999

[30] Foreign Application Priority Data

Feb. 5, 1998 [FR] France .................................. 98 01356

[51] Int. Cl.[7] .................................................. H04N 17/02
[52] U.S. Cl. ........................................ 348/181; 348/189
[58] Field of Search ........................... 348/190, 175–178, 348/180, 181, 189; 382/209, 217, 218, 195, 190, 206

[56] References Cited

U.S. PATENT DOCUMENTS

| | | | |
|---|---|---|---|
| 2,380,244 | 7/1945 | Jones et al. ................................. | 95/10 |
| 4,513,318 | 4/1985 | Wilensky et al. ......................... | 348/181 |
| 5,537,145 | 7/1996 | Misels ....................................... | 348/181 |
| 5,572,444 | 11/1996 | Lentz et al. .............................. | 348/181 |
| 5,574,664 | 11/1996 | Feasey ...................................... | 348/189 |
| 5,764,284 | 6/1998 | Stokes ....................................... | 348/192 |
| 6,057,882 | 5/2000 | Lambrecht ............................... | 348/181 |

FOREIGN PATENT DOCUMENTS

| | | |
|---|---|---|
| 0542012 | 5/1993 | European Pat. Off. . |
| 0750431 | 12/1996 | European Pat. Off. . |

OTHER PUBLICATIONS

Gray, J.E., SMPTE Journal, vol. 99, No. 12, Dec. 1, 1990, pp. 1001–1007.

Barten, P.G.J., "Physical Model for the Contrast, Sensitivity of the Human Eye" Proc. Spin 1666 57–72 (1992).

Hunt, R.W.G., "Revised Colour–Appearance Model for Pelated and Unrelated Colours", Color Res. Appl. 16, 146–165 (1991).

Bartelson, C.J., Breneman, E.J., "Brightness Perception in Complex Fields," J. Opt. Soc. Am. 57, 953–957 (1967).

Daly, S. "The Visible Differences Predictor: An Algorithm for the Assessment of Image Fidelity" Digital Images and Human Vision, Chap 14, Mit Press, Boston 1993.

*Primary Examiner*—Victor R. Kostak
*Attorney, Agent, or Firm*—Jay L. Chaskin

[57] ABSTRACT

When the display system is calibrated, digital test image delivered as input to system provides a resulting image perceived the human eye as being composed of a plurality individual elements which themselves are composed two grey levels and have the same contrast from element to another.

10 Claims, 4 Drawing Sheets

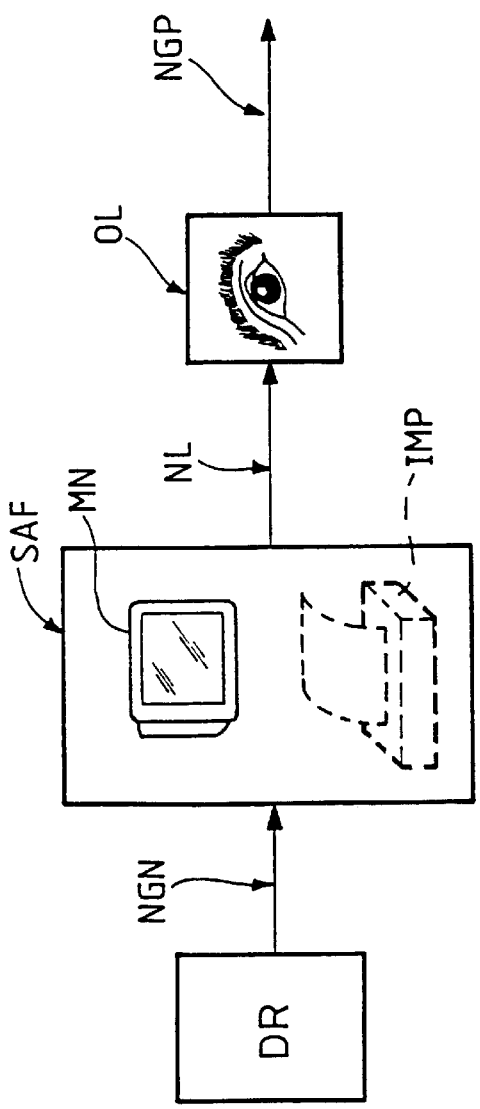
FIG_1
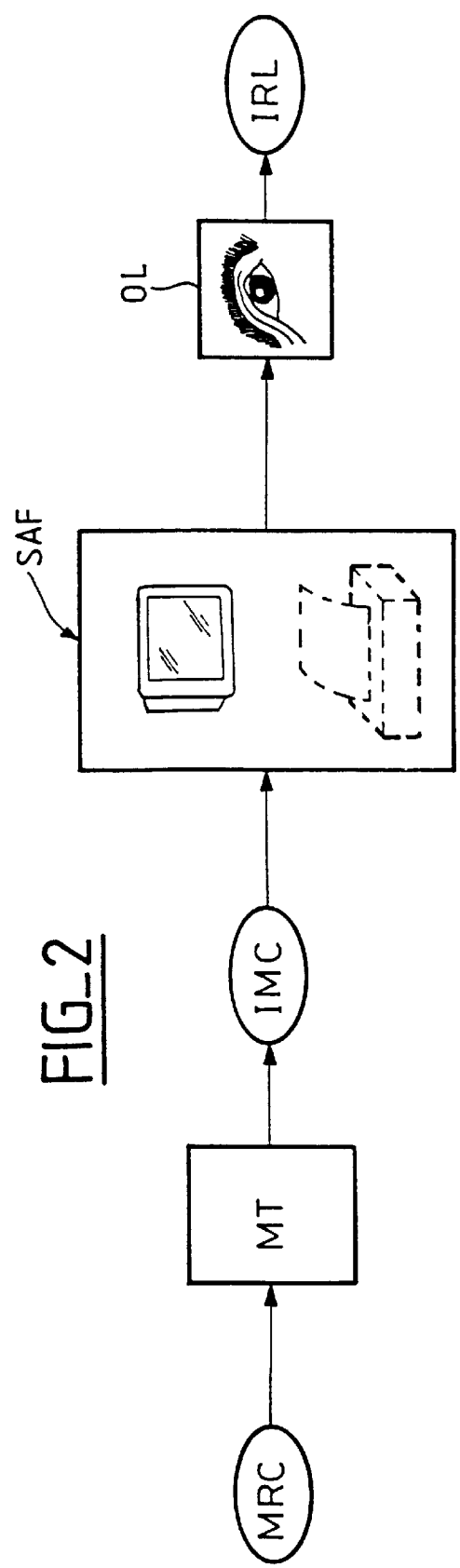
FIG_2

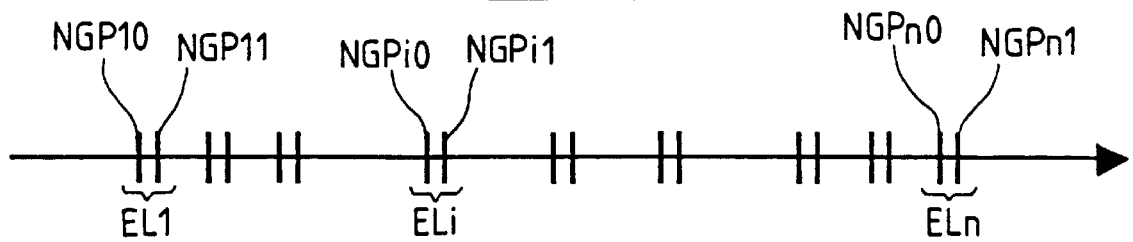
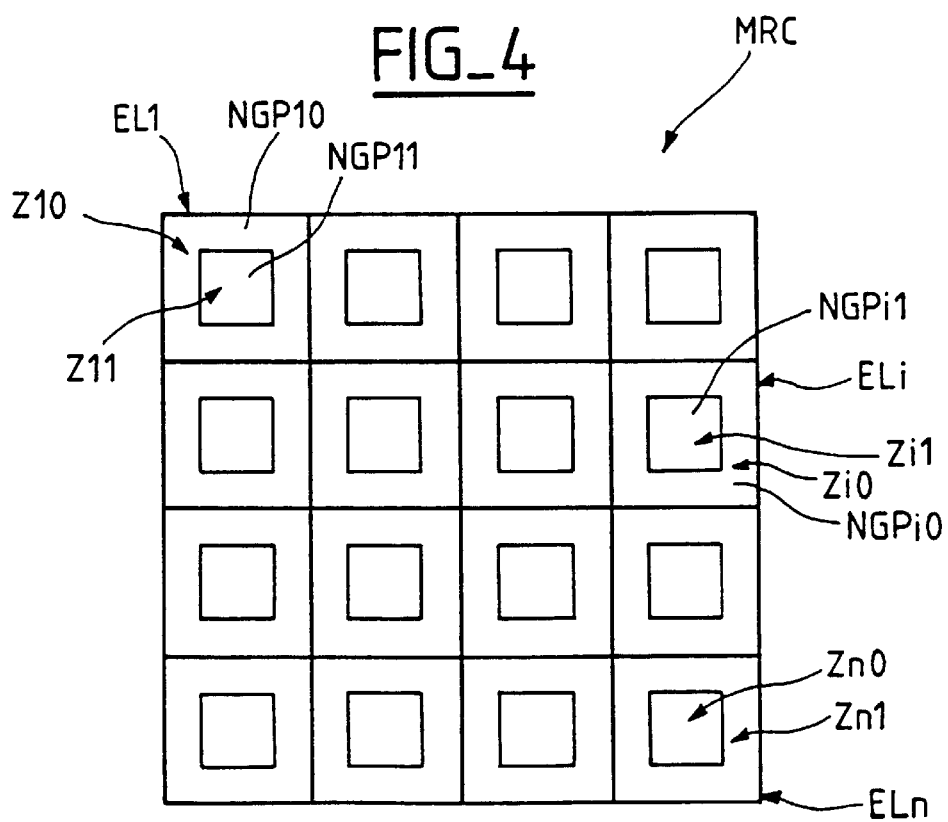

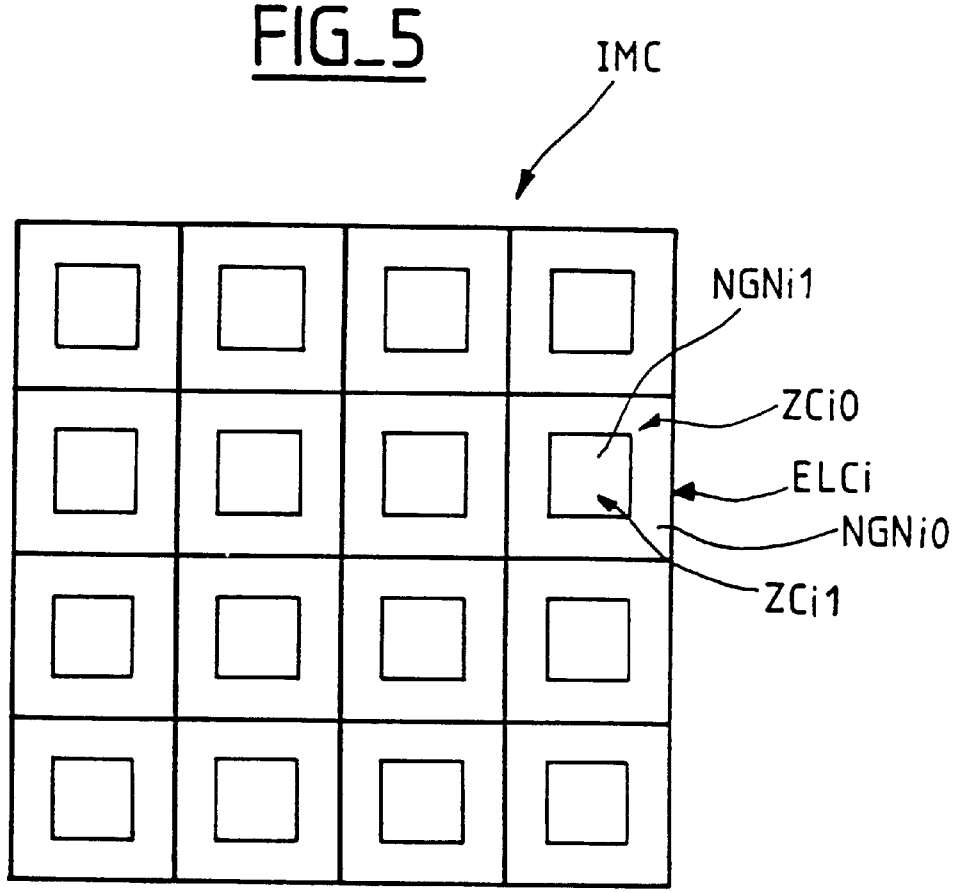

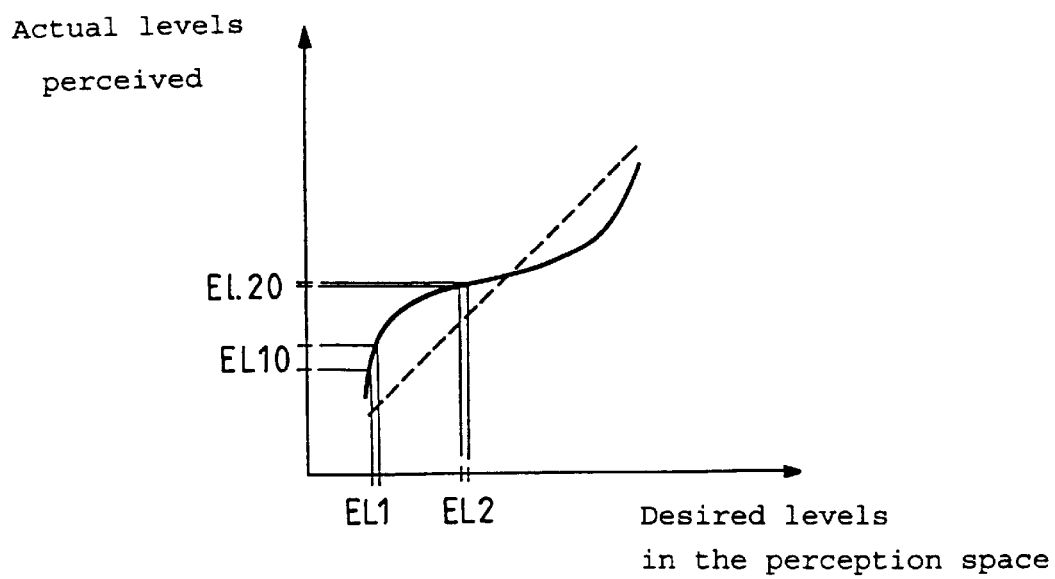
FIG_7
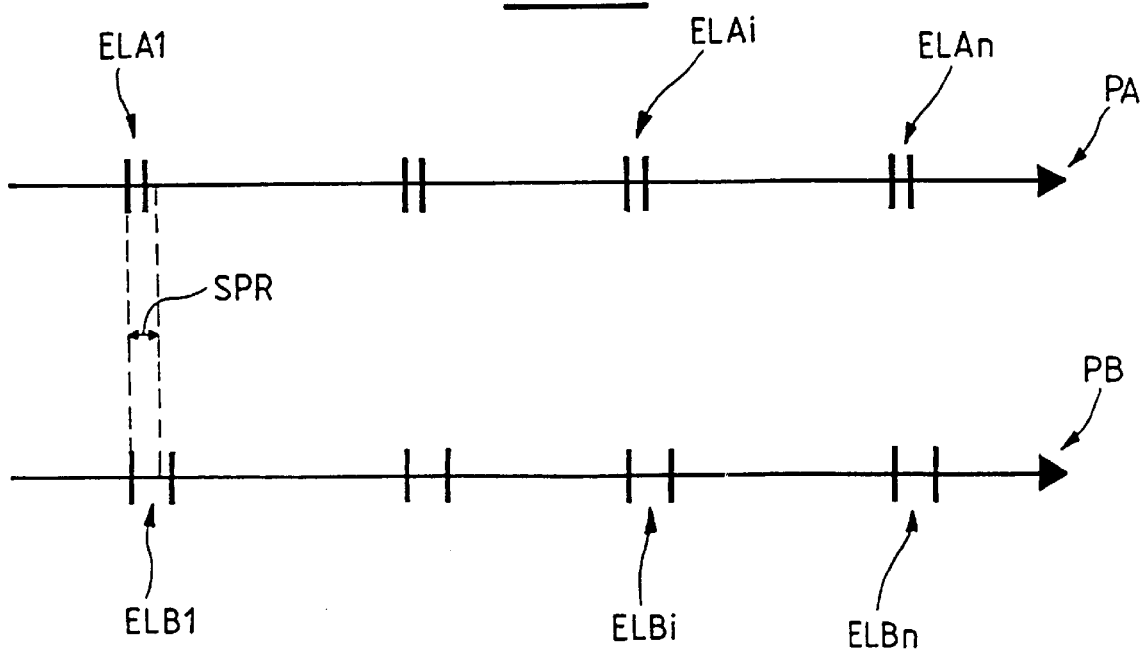
FIG_6

METHOD OF CHECKING THE CALIBRATION OF A DISPLAY SYSTEM IN PARTICULAR A PRINTER

BACKGROUND OF THE INVENTION

The invention relates to the checking of the calibration of a display system. A display system is, for example, a monitor which may or may not be associated with its graphics card or a printer producing a paper proof observed in the light of an office, or a laser reprographics device producing a film observed in a negative viewer, or optionally a combination of several of these display means.

A display means of a display system, for example connected to a medical imaging apparatus, receives as input a digital image, each point of which is assigned a brightness value (generally between 0 and 255) which will be referred to below by the expression "digital grey level". Each pixel of the image reproduced by the display means then has a brightness level whose value depends on the digital grey level of the corresponding point in the input digital image. The transfer function of a display means is the correspondence law between the input digital grey levels and the output brightness levels.

A display means is said to be calibrated when its transfer function coincides with a predefined transfer function, called below the "target transfer function".

Among known calibration methods, mention may be made of those which use generic digital images, i.e. digital images that are independent of the target transfer function and of the observation conditions, in order to test the actual transfer function of a display means. This method of the prior art therefore uses optical density measurements or brightness levels of the various grey levels of these digital test images reproduced by the display means.

The invention aims to provide a radically different solution to the problems of calibrating display systems.

BRIEF SUMMARY OF THE INVENTION

An embodiment of the invention provides a means of checking the calibration of a display system which is rapid and requires no direct measurement or, at the very least, only a very small number of direct measurements.

The embodiment of the invention therefore proposes to generate, for given observation conditions and for a given target transfer function, a digital test image the only observation of which by the human eye under these given observation conditions is sufficient to determine whether the actual transfer function of the display system coincides with its target transfer function (i.e. the transfer function of the calibrated system) and therefore to determine whether the system is correctly calibrated.

More specifically, according to a general characteristic of an embodiment of the invention, when the transfer function of the display system coincides with the target transfer function, the digital test image used in the present invention is perceived by the human eye as being composed of a plurality of individual elements which themselves are composed of two levels, for example two grey levels, and have the same contrast between these two levels from one element to another.

In other words, the embodiment of the invention provides a method of checking the calibration of a display system, in which a visual calibration test pattern intended to be displayed on a display means of the said system and observed by the human eye is generated, this test pattern comprising at least a first part formed by several separate regions each composed of a first area having a first light level (for example, the first grey level) and a second area having a second light level (for example, the second grey level), all the light levels being different from one another and the difference between the two levels (contrasts) of the two areas of a region being predetermined and the same for all the regions.

An overall transfer function is determined from a first predefined transfer function of the calibrated display system (target transfer function) and a second predefined transfer function from a mathematical model of the human visual system.

A digital calibration image corresponding to the calibration test pattern is determined from the visual calibration test pattern and from the inverse of the said overall transfer function.

The said digital calibration image is delivered as input to the display system and the resulting image thus obtained is displayed on the display means, and the calibration of the display system is checked by displaying the existing image.

In other words, the digital levels, which are delivered as input to the display system, are determined from the levels which should actually be perceived by the human brain when the calibration test pattern is observed under predetermined observation conditions and when the transfer function of the display system coincides with the target transfer function, that is to say when the system is calibrated. These digital input levels are determined by inverting the combination of the target transfer function of the display system and of the transfer function of the human visual system for these observation conditions. Several mathematical models of the human visual system are well known and available to those skilled in the art (such as, for example, the Barten model) for determining the transfer function of the human visual system.

The target transfer function of the display system may, for example, be generated beforehand in a conventional manner using, for example, optical density brightness level measurements. The embodiment of the invention then makes it possible, in particular when the display signal simply consists of a monitor or a display screen, the target transfer function of which is known beforehand, to then check any subsequent calibration of the monitor by simply displaying the calibration test pattern.

This being so, the embodiment of the invention applies particularly advantageously to the checking of the calibration of a printer connected, for example with a monitor, to common processing means. Mention may be made, for example, of a printer and of a monitor which are connected to the output of the same medical imaging system.

Thus, in an embodiment of the invention, a visual calibration test pattern intended to be displayed on the display means (for example the monitor) and on the printer and which is to be observed by the human eye is generated. This test pattern has the same features as those which have just been described above. However, an overall transfer function of the display system is determined from a first predefined transfer function of the calibrated monitor (target transfer function of the monitor) and from a second predefined transfer function of a mathematical model of the human visual system. The digital calibration image corresponding to the calibration test pattern is also determined from the calibration test pattern and from the inverse of the overall function. The digital calibration image is delivered as input to the display system and the resulting image thus obtained is printed by the printer. The calibration of the printer is then checked by displaying the resulting image.

In other words, the invention here makes it possible, using the said calibration test image, to check the calibration of a printer using another calibrated display means, for example a monitor.

When the discretization increment display system is smaller than the visual detection threshold of the human eye, of the contrast a visual calibration test pattern is advantageously generated which has a first part associated with a first constant difference in light level (constant difference in contrast for all the elements of the test pattern) smaller than the visual detection threshold and which also has a second part that is structurally similar to the first part and associated with a second constant difference in light level greater than the visual detection threshold.

In other words, when the display means have a smaller discretization increment than the detection threshold of the human visual system, a test pattern composed of two subpatterns is used. The contrast of the two elements of the first subpattern is chosen to be slightly lower than the detection threshold of the human visual system, while the contrast of the elements of the second subpattern is chosen to be slightly higher than the detection threshold of the human visual system.

In this variant, the system may be tested by contrasts of the elements of if the contrast of one of subpattern can be perceived, least one of the elements cannot be perceived, it may calibration of the display observing the perceived the two subpatterns. Thus, the elements of the first or if the contrast of at of the second subpattern then be concluded that the system is not correctly calibrated.

When the discretization increment display system is greater than the visual detection threshold of the human eye, a visual calibration test pattern comprising only the first part is generated and a constant difference in visual level significantly greater than the discretization increment, for example equal to three or four times this increment, is then chosen. Thus, if the various perceived contrasts of the various elements of the test pattern are not constant, but change from one element to another, it may be concluded from this that the system is not correctly calibrated.

In the variant of the invention relating to the printer connected, with the monitor, to the medical imaging system, the various elements of the selection of the characteristics of the printer are generated, especially its discretization increment, but the inverse target transfer function of the monitor is used to define the digital calibration image from the visual calibration test pattern.

BRIEF DESCRIPTION OF THE DRAWINGS

Further advantages and features appear on examining the an entirely non-limiting method of implementation and on examining the appended drawings in which:

FIG. 1 illustrates, very diagrammatically, an image perception chain,

FIG. 2 illustrates, very diagrammatically, a calibration check of an embodiment to the invention using a calibration test pattern, FIGS. 3 and 4 illustrate, very diagrammatically, a calibration test pattern which can be used in a first variant of an embodiment of the invention, FIG. 5 illustrates a digital test image corresponding to the calibration test pattern of FIG. 4, FIG. 6 illustrates, very diagrammatically, the generation of a visual calibration test pattern according to a second variant of an embodiment of the invention, and FIG. 7 illustrates a curve showing the differences between the actual contrast and the desired contrast,

DETAILED DESCRIPTION OF THE INVENTION

In FIG. 1, the label DR denotes a medical imaging system delivering digital images, each composed of a plurality of points each assigned a digital value, typically between 0 and 255, and representative of a digital grey level NGN, to a display system SAF (which may be composed of a single display monitor MN or else the monitor MN and a printer IMP which are connected together to this system DR).

The display system then delivers an image which may be displayed on the screen or printed on the printer IMP and each pixel of which, corresponding to each input point (digital input value), is assigned a brightness level NL. The image is perceived by the human visual system OL and the human brain then perceives a perceived grey level NGP for each brightness level.

It is assumed in a first application of the invention that the display system SAP is composed only of the monitor MN.

The method of checking the calibration in an embodiment of the invention consists, as illustrated more particularly in FIG. 2, in generating a digital test image IMC from a visual display test pattern MRC and from an overall transfer function inverted in processing means MT. This digital test image or digital calibration image IMC is then delivered as input to the display system SAF and is reproduced by the display screen, for example. The human brain then perceives a resulting perceived image IRL.

According to a first variant of an embodiment of the invention (FIGS. 3 and 4), a plurality (n) [lacuna] elements ELi, each composed of two perceived grey levels $NGPi0$ and $NGPi1$, are defined on the scale of grey levels perceived by the human brain. The difference between these two levels, that is to say the contrast of each element ELi is constant and the same for each of the elements. On the other hand, all the levels NGPi are different from one another.

Based on this definition of the n elements ELi, a visual calibration test pattern MRC is defined which here is composed only of a first part formed from several (n) separate regions which are also labeled ELi. Each of these regions corresponds to an element ELi of the scale of perceived grey levels. Each region ELi is composed of a first area $Zi0$ having a first light level, that is to say a first perceived grey level $NGPi0$, equal to that of the element ELi defined in FIG. 3 and of a second area $Zi1$ having the grey level $NGPi1$.

In this figure, square areas have been shown. Of course, any other shape of area, such as, for example, circular areas, could have been used.

An overall transfer function is then determined from the combination of the target transfer function of the monitor, that is to say the transfer function of the calibrated monitor, and from a transfer function derived from a mathematical model of the human visual system. This transfer function of the human visual system makes it possible to associate a perceived grey level with each brightness level. There are many mathematical models of the human visual system available to those skilled in the art. Thus, mention may be made of the so-called Barten model described, for instance, in the article by P. G. J. Barten: "Physical model for the Contrast Sensitivity of the human eye"; Proc. SPIN 1666, 57–72 (1992) and "Spatio-temporal model for the Contrast Sensitivity of the human eye and its temporal aspects", Proc. SPIE 1913-01 (1993).

Mention may also be made, for example, of the Hunt model (R. W. G. Hunt, "Revised colour-appearance model for related and unrelated colours", Color Res. Appl. 16, 146–165 (1991), the Bartelson and Breneman model (C. J. Bartelson and E. J. Breneman, "Brightness perception in complex fields". J. Opt Soc. Am. 57, 953–957 (1967), the Daly local conical model (S. Daly, "The visible differences predictor: An algorithm for the assessment of image fidelity", taken from the work: in Digital Images and Human vision, A. B. Watson, Ed. Chapter 14, MIT Press, Boston, 1993, the Weber-Fechner law, particularly known to those skilled in the art.

Next, the overall transfer function is inverted, in a conventional and known manner, so as to obtain an inverted transfer function, that is to say a transfer function associating a digital grey level of a point in a digital calibration image with each perceived grey level of a pixel of the visual calibration test pattern.

The digital calibration image IMC illustrated in FIG. 5, and corresponding to the virtual calibration test pattern, is then generated. This digital calibration image IMC is defined, in a manner similar to the visual calibration test pattern, by a plurality of digital regions ELCi each composed of a first area ZCi0 and of a second area ZCi1. All the pixels of the first area are assigned a digital grey level NGNi0 and all the pixels of the second area are assigned a digital grey level NGNi1.

The calibration test pattern as defined in FIGS. 3 and 4, and consequently the corresponding digital calibration image IMC, is especially used when the discretization increment of the monitor is greater than the contrast detection threshold of the human eye. Elements ELi will then be chosen whose contrast, that is to say the difference in perceived grey levels, is significantly greater than the discretization increment, for example equal to three or four times this increment. The fact that a contrast significantly greater than the discretization increment is chosen makes it possible to minimize the impact of the variation in this discretization increment along the scale of perceived grey levels. However, it is possible to choose smaller contrasts if the scale of perceived grey levels is divided into areas within which the discretization increment remains approximately constant.

If the discretization increment of the display system is smaller than the contrast detection threshold of the human eye, a visual calibration test pattern composed in fact of two parts (FIG. 6) will be defined. More specifically, the first part will be composed of n elements ELAi, each contrast of which is less than the contrast detection threshold SPR of the human eye. The second part PB will consist of n elements ELBi, the contrast of which will be chosen to be greater than the threshold SPR. In practice, a contrast slightly less than the threshold SPR, for example 0.8 or 0.9 times this threshold, will be chosen for the elements ELAi, whereas a contrast slightly greater [lacuna] SPR (for example 1.1 or 1.2 times this threshold) will be chosen for the elements ELBi.

Each of the parts PA and PB will therefore be composed of an image similar to that illustrated in FIG. 4. The corresponding complete display test pattern would, if it were fully perceived by the eye, be equal to the juxtaposition of two test patterns such as those illustrated in FIG. 4

FIG. 7 shows, in the in the actual solid line, the variation in the actual contrast of the various elements of the image IRL actually perceived by the human eye, compared with the desired contrast of these same elements, that is to say the contrast of these elements as they ought to be perceived in the visual calibration test pattern if the system were correctly calibrated.

If the system is correctly calibrated, the curve of correspondence between the actual contrast and the desired contrast is in fact the straight line passing through the origin with a slope of 45°, as illustrated by the dotted line in FIG. 7.

However, this FIG. 7 shows that when the slope of the curve is greater than 45° the contrast of the element ELI is in fact increased (actual element EL10). However, when the slope of the curve is less than 45° the contrast of an element EL2 is decreased (element EL20).

From this observation, and if reference is more particularly made to a visual calibration test pattern such as that used in the variant in FIG. 6, it may be observed that if the slope of the actual curve in FIG. 7 is equal to 45° the contrast of an element of the first part PA of the test pattern is not perceived by the human eye, whereas the contrast of the corresponding element of the second part PB is perceived.

When the slope of the actual curve is significantly greater than 45°, the contrast of the two corresponding elements of the first part PA and of the second part PB of the test pattern may be perceived. However, when the slope of the actual curve is significantly less than 45°, the contrast of neither of the two corresponding elements not of the first part PA and of the second part PB of the test pattern may be perceived. Consequently, the calibration of the display system, that is to say in this case the calibration of the monitor but also the calibration of the printer, may be checked by observing the perceived contrast of the elements of the two parts PA and PB. If the contrast of at least one of the elements of the first part PA can be perceived, or if the contrast of at least one [lacuna] of the second part PB cannot be perceived, it may then be concluded that the display system is not calibrated. If the contrast of all the elements of the first part PA cannot be perceived, and if the contrast of all the elements of the second part PB can be perceived and if the actual transfer function of the display system is assumed to coincide with the target transfer function, at least at one point, it may be concluded that the display system is calibrated. If it is not known that this coincidence between the actual transfer function [lacuna] the target transfer function exists at a point, it will then be necessary to take a direct calibration measurement at a point, for example on a black level, to ensure that the system is properly calibrated. For example, a direct measurement of the brightness or of the optical density may be taken for this particular point and this measurement may be compared with a calibration reference.

If a visual calibration test pattern is used like the one illustrated in FIGS. 3 and 4, that is to say a test pattern for which the contrast at each element is significantly greater than the discretization increment, the calibration of the system may be checked by observing the perceived contrast of the various elements. If the perceived contrast of the various elements is not constant but changes from one element to another, it may then be concluded that the display system is not calibrated. If the contrast of all the elements is constant, and if the actual transfer function of the display system is assumed to coincide with the target transfer function, at least at two points, it may be concluded from this that the system is calibrated. If it is not known for certain that this actual transfer function coincides at two points with the target transfer function, it is then necessary to take two direct calibration measurements in order to reach the conclusion that the system is correctly calibrated.

It will now be assumed, in a second application of the invention, that the display system SAP is composed of the monitor MN and the printer IMP which are connected together to the medical imaging system DR.

The various elements of the test pattern MRC, especially the contrasts and the minimum and maximum values of the grey levels, depending on the characteristics of the printer and in particular on its discretization increment, are then generated.

This being so, the inverted target transfer function of the monitor is used to define the digital calibration image IMC from the test pattern MRC.

Various modifications in structure and/or function and/or steps may be made by one skilled in the art without department from the scope and extent of the invention.

What is claimed is:

1. A method of checking the calibration of a display system comprising the steps of:
    (a) generating a visual calibration test pattern intended to be displayed on a display means of the system and observed by the human eye, the test pattern comprising at least a first part formed by several separate regions each composed of a first area having a first light level and a second area having a second light level, all the light levels being different from one another and the difference between the two levels of the two areas of a region being predetermined and the same for all the regions;
    (b) determining an overall transfer function from a first predefined transfer function of the calibrated display system and a second predefined transfer function from a mathematical model of the human visual system;
    (c) determining a digital calibration image corresponding to the calibration test pattern from the visual calibration test pattern and from the inverse of the overall transfer function;
    (d) providing the digital calibration image as an input to the display system and;
    (e) displaying the resulting image thus on the display means; and
    (f) checking the calibration of the display system by displaying the resulting image.

2. The method of claim 1 wherein the display systems is a printer.

3. The method of claim 1 wherein the display system is a monitor.

4. A method of checking the calibration of a display system comprising the steps of:
    (a) providing a printer forming a display system connected to a common processing means;
    (b) generating a visual calibration test pattern intended to be displayed on the display means and on the printer and observed by the human eye, the test pattern comprising at least a first part formed by several separate regions each composed of a first area having a first light level and a second area having a second light level, all the light levels being different from one another and the difference between the two levels of the two areas of a region being predetermined and the same for all the regions;
    (c) determining an overall transfer from a first predefined transfer function of the calibrated monitor and from a second predefined transfer function of a mathematical model of the human visual system;
    (d) determining a digital calibration image corresponding to the calibration test pattern from the visual calibration test pattern and from the inverse of the overall transfer function;
    (e) providing the digital calibration image as an input to the display system;
    (f) printing the resulting image thus obtained; and
    (g) checking the calibration of the printer by displaying the resulting image.

5. The method according to claim 1 wherein the discretization increment of the display system being smaller than the visual contrast detection threshold of the human eye, a visual calibration test pattern is generated which has a first part associated with a first constant difference in light level smaller than the visual detection threshold and which also has a second part that is structurally similar to the first part and associated with a second constant difference in visual level greater than the visual detection threshold.

6. The method according to claim 4 wherein the discretization increment of the display system being greater than the visual contrast detection threshold of the human eye, a visual calibration test pattern is generated which has a first part associated with a first constant difference in light level smaller than the visual detection threshold and which also has a second part that is structurally similar to the first part and associated with a second constant difference in visual level greater than the visual detection threshold.

7. The method according to claim 1 wherein the discretization increment of the display system being greater than the visual contrast detection threshold of the human eye, a visual calibration test pattern comprising only the first part is generated and in that the constant difference in visual level is significantly greater than the discretization increment.

8. The method according to claim 4 wherein the discretization increment of the display system being greater than the visual contrast detection threshold of the human eye, a visual calibration test pattern comprising only the first part is generated and in that the constant difference in visual level is significantly greater than the discretization increment.

9. The method of claim 7 wherein the constant difference is equal to 3 or 4 times the discretization increment.

10. The method of claim 8 wherein the constant difference is equal to 3 or 4 times the discretization increment.

* * * * *